United States Patent [19]

Nakamura et al.

[11] Patent Number: 4,921,632

[45] Date of Patent: May 1, 1990

[54] LIQUID CRYSTAL COMPOUNDS AND COMPOSITIONS

[75] Inventors: Toyokazu Nakamura; Yuzi Kato; Shohei Naemura; Chizuka Tani, all of Tokyo; Masahiro Satoh, Kyoto; Kunikiyo Yoshio, Ohmihachiman; Hiroshi Kishiki, Takatsuki; Hiroshi Hoshino, Hirakata, all of Japan

[73] Assignees: NEC Corporation, Tokyo; Sanyo Chemical Industries, Ltd., Kyoto, both of Japan

[21] Appl. No.: 234,107

[22] Filed: Aug. 19, 1988

[30] Foreign Application Priority Data

Aug. 26, 1987 [JP] Japan .................................. 62-213974

[51] Int. Cl.$^5$ .................... C09K 19/34; C09K 19/30; C09K 19/12; C09K 19/22; C09K 19/00; C09K 19/32; C09F 19/06; C09F 19/20

[52] U.S. Cl. ............................. 252/299.1; 252/299.01; 252/299.6; 252/299.61; 252/299.62; 252/299.63; 252/299.64; 252/299.65; 252/299.66; 252/299.67; 252/299.68; 350/350 R; 350/350 S; 534/577; 544/229; 544/238; 544/239; 544/240; 544/241; 544/295; 544/296; 544/298; 544/315; 544/316; 544/318; 544/322; 544/330; 544/331; 544/332; 544/333; 544/334; 544/335; 544/357; 544/406; 544/409; 544/408; 544/336; 558/384; 558/412; 558/416; 558/271; 558/272; 558/273; 558/275; 558/276; 558/288; 558/290; 560/9; 560/10; 560/18; 560/17; 560/21; 560/22; 560/23; 560/20; 560/35; 560/59; 560/61; 560/62; 560/64; 560/73; 560/65; 560/55; 560/8; 560/100; 560/102

[58] Field of Search ............... 252/299.1, 299.01, 299.6, 252/299.61, 299.62, 299.63, 299.64, 299.65, 299.66, 299.67, 299.68; 350/350 R, 350 S; 534/577; 544/229, 238, 239, 240, 241, 295, 296, 298, 315, 316, 318, 322, 330, 331, 332, 333, 334, 335, 357, 406, 408, 409, 336; 558/384, 412, 414, 482, 271, 272, 273, 275, 276, 288, 290; 560/10, 18, 17, 9, 21, 22, 23, 20, 35, 59, 61, 62, 73, 64, 65, 55, 100, 102, 8

[56] References Cited

U.S. PATENT DOCUMENTS 4,576,732  3/1986  Isogai et al. .................. 252/299.66
4,613,209  9/1986  Goodby et al. ............... 252/299.67

FOREIGN PATENT DOCUMENTS 0110299   6/1984  European Pat. Off. .
3534777   4/1987  Fed. Rep. of Germany ... 252/299.6
62-169883 7/1987  Japan ........................... 252/299.67

OTHER PUBLICATIONS

Japanese Journal of Applied Physics, vol. 26, No. 2, Feb. 1987, pp. L77-L-78.
Chemistry Express, vol. 2, No. 1, pp. 53-56 (1987).
Yoshino, K. et al., Jap. J. Appl. Phys., vol. 26, No. 2, pp. L77-L78 (1987).
Yoshino, K. et al., Chem. Express, vol. 2, No. 1, pp. 53-56 (1987).
Goodby, J. W. et al., Liquid Crystals and Ordered Fluids, vol. 4, Griffin, A. et al., Ed., Plenum Press, N.Y., pp. 1-32 (1984).
Goodby, J. W. et al., Mol. Cryst. Liq. Cryst., vol. 110, pp. 175-203 (1984).
C.A., vol. 106: 206165y (Jun. 1987)

Primary Examiner—Teddy S. Gron
Attorney, Agent, or Firm—Armstrong, Nikaido, Marmelstein, Kubovick & Murray

[57] ABSTRACT

Liquid Crystal compounds represented by the following formula are disclosed.

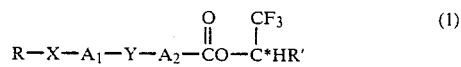

wherein R and R' are independently selected from alkyl groups containing 1~20 carbon atoms; X is —O—, —O—CO—O— or direct bond; $A_1$ and $A_2$ are independently cyclic groups (such as phenylene and biphenylene), said cyclic groups may be substituted with 1~4 fluorine, chlorine or bromine atoms, or 1 or 2 substituent groups selected from the group consisting of cyano, nitro and trifluoromethyl groups; Y is —CO—O—, —O—CO—, —C≡C—, —CH$_2$O—, —OCH$_2$—, —CH=N—, —N=CH—, —N=N—, —CH$_2$S—, —SCH$_2$— or direct bond; and * represents asymmetric atom providing optical activity.

22 Claims, 12 Drawing Sheets

LIQUID CRYSTAL COMPOUNDS AND COMPOSITIONS

BACKGROUND OF THE INVENTION

1. Field of the Invention

This invention relates to liquid crystal compounds and compositions.

2. Description of the Prior Art

There have been known several ferroelectric liquid crystals, such as 2-methylbutyl ester of 4-n-octyl-4'-biphenylcarboxylic acid (hereinafter referred to as Compound A) (page 111, Preprint of the 10th Symposium on Liquid Crystals, 1984) and p'-(1-methylheptyloxycarbonyl)phenyl ester of 4-n-octyloxy-4'-biphenylcarboxylic acid (hereinafter referred to as Compound B) (page 173, Preprint of the 11th Symposium on Liquid Crystals, 1985).

However, the value of spontaneous polarization of Compound A is small (smaller than 10 $nC/cm^2$), though the compound shows a chiral smectic phase of ferroelectricity at a temperature near the room temperature. On the other hand, Compound B has larger value of spontaneous polarization (80 $nC/cm^2$), but mesomorphic temperature range of the compound is much higher than the room temperature (72.5–121.5° C.).

SUMMARY OF THE INVENTION

It is an object of the present invention to provide a liquid crystal compound showing a chiral smectic phase near the room temperature.

It is another object of the present invention to provide a liquid crystal compound having improved value of spontaneous polarization.

It is still another object of the present invention to provide a liquid crystal compound showing a chiral smectic phase near the room temperature and having an improved value of spontaneous polarization.

It is yet another object of the present invention to provide a liquid crystal composition showing a chiral smectic phase near the room temperature having an improved value of spontaneous polarization.

Briefly, these and other objects of the present invention as hereinafter will become more readily apparent have been attained broadly by a liquid crystal compound represented by the following general formula:

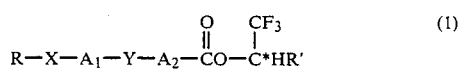

(1)

wherein R and R' are independently selected from alkyl groups containing 1~20 carbon atoms; X is —O—, —O—CO—O— or direct bond; $A_1$ and $A_2$ are independently cyclic groups (such as phenylene and biphenylene), said cyclic groups may be substituted with 1~4 fluorine, chlorine or bromine atoms, or 1 or 2 substituent groups selected from the group consisting of cyano, nitro and trifluoromethyl groups; Y is —CO—O—, —O—CO—, —C≡C—, —CH₂O—, —OCH₂—, —CH=N—, —N=CH—, —N=N—, —CH₂S—, —SCH₂— or direct bond; and * represents asymmetric atom providing optical activity.

DETAILED DESCRIPTION OF THE PREFERRED EMBODIMENTS

Figure 1:
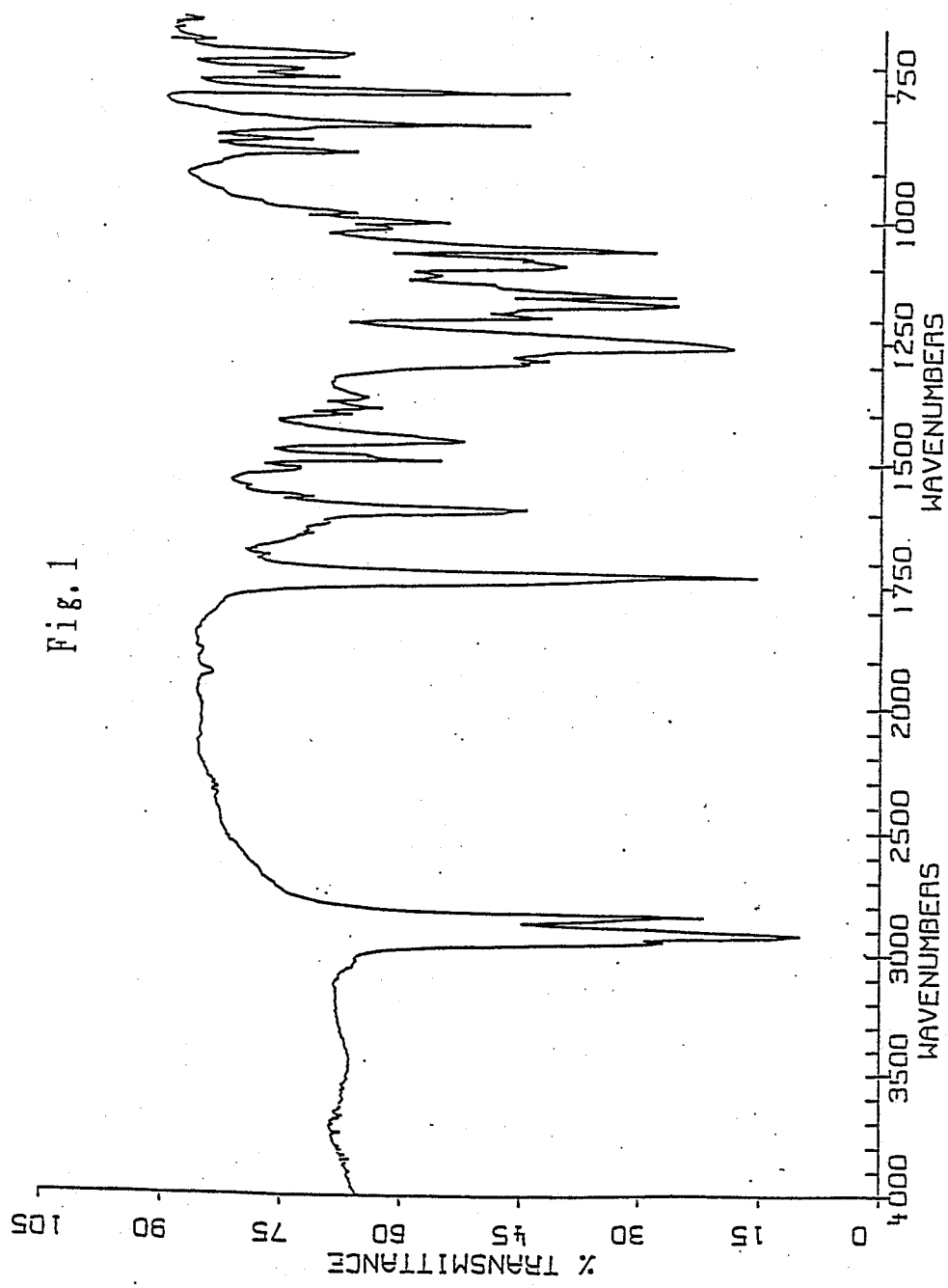
FIG. 1, FIG. 2 and FIG. 3 are IR spectrum, H-NMR spectrum and F-NMR spectrum, respectively, of a liquid crystal compound of Example 1.

In the general formula (1), suitable examples of cyclic groups $A_1$ and $A_2$ are

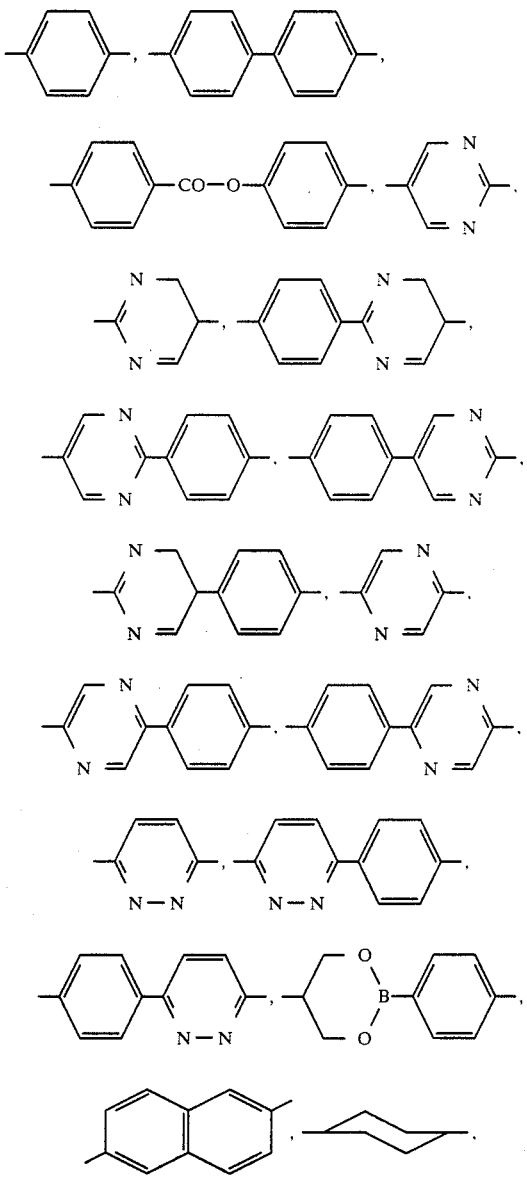

-continued

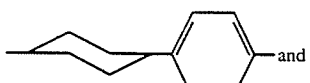and

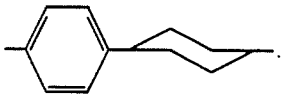.

These cyclic groups may be substituted with 1-4 halogen atoms, such as fluorine, chlorine and bromine atoms, or/and 1-2 substituent groups, such as cyano, nitro and trifluoromethyl groups. Among these, preferred are

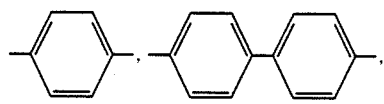,

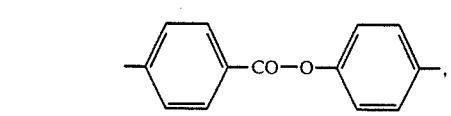,

-continued

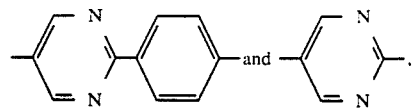

which may be substituted with 1-4 fluorine atoms.

In the general formula (1), alkyl groups R and R' include straight-chain alkyl groups containing 1-20 carbon atoms, such as methyl, n-propyl, n-hexyl, n-octyl, n-decyl, n-octadecyl groups; and branched alkyl groups containing 3-20 carbon atoms, such as 1-methyl-butyl, 4-methyl-pentyl, 8-methyl-decyl and 9-methyl-decyl groups, and optically active alkyl groups, such as, optically active 1-methyl-propyl, optically active 1-methyl-heptyl and optically active 2-methyl-butyl groups. Preferred are straight-chain alkyl groups containing 6-14 carbon atoms for R, and alkyl groups containing 3-10 carbon atoms for R'.

X is preferably —O— or direct bond (single bond). Y is preferably $$-CO-O-, -C\equiv C-, -OCH_2-,$$

or direct bond.

Illustrative examples of the compounds represented by the formula (1) include those shown in Table 1

TABLE 1

| No. | R | X | A₁ | Y | A₂ | R' |
|---|---|---|---|---|---|---|
| 1 | DE | —O— | phenyl | —CO—O— | phenyl | HE |
| 2 | DE | —O— | phenyl | —CO—O— | F-phenyl | HE |
| 3 | DE | —O— | biphenyl | —CO—O— | phenyl | HE |
| 4 | DE | —O— | biphenyl | —CO—O— | phenyl | PE |
| 5 | DE | —O— | biphenyl | —CO—O— | phenyl | DE |
| 6 | DE | —O— | biphenyl | —CO—O— | F-phenyl | HE |
| 7 | DE | —O— | F-phenyl | —CO—O— | biphenyl | HE |

TABLE 1-continued
| No. | R | X | A₁ | Y | A₂ | R' |
|---|---|---|---|---|---|---|
| 8 | OC | — | 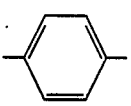 | —CO—O— | 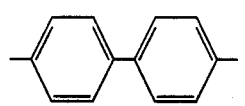 | OC |
| 9 | DE | —O— | 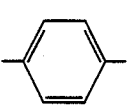 | —C≡C— | 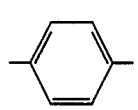 | HE |
| 10 | DE | —O— | 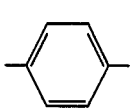 | —C≡C— | 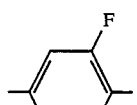 | HE |
| 11 | DE | —O— | 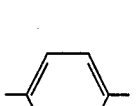 | —C≡C— | 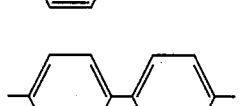 | HE |
| 12 | DE | —O— | 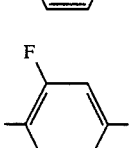 | —C≡C— | 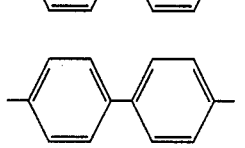 | HE |
| 13 | DE | —O— | 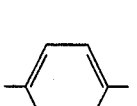 | —C≡C— | 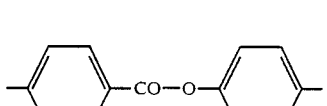 | HE |
| 14 | DE | —O— | 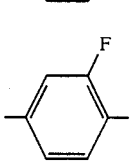 | —C≡C— | 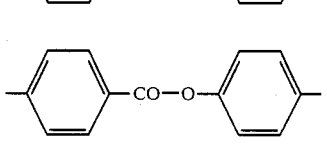 | HE |
| 15 | DE | —O— | 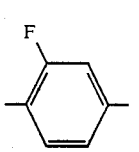 | —C≡C— | 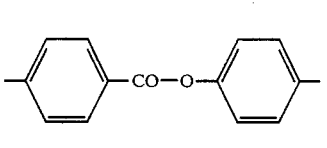 | HE |
| 16 | DE | —O— | 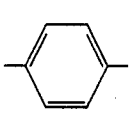 | —C≡C— | 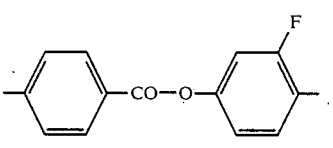 | HE |
| 17 | DE | —O— | 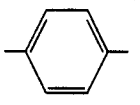 | —OCH₂— | 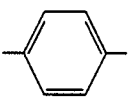 | HE |
| 18 | DE | —O— | 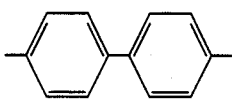 | —OCH₂— | 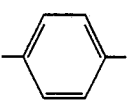 | HE |
| 19 | DE | —O— | 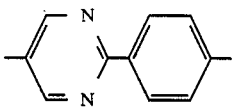 | —CO—O— | 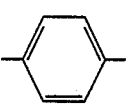 | HE |

TABLE 1-continued
| No. | R | X | A₁ | Y | A₂ | R' |
|---|---|---|---|---|---|---|
| 20 | DE | — | 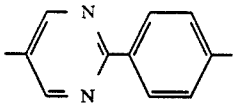 | —CO—O— | 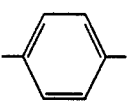 | HE |
| 21 | DE | —O— | 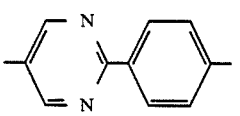 | —CO—O— | 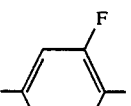 | HE |
| 22 | DE | — | 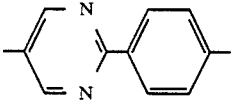 | —CO—O— | 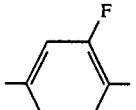 | HE |
| 23 | DE | —O— | 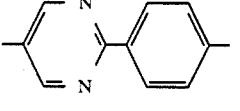 | —C≡C— | 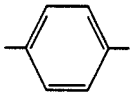 | HE |
| 24 | DE | — | 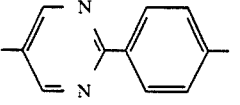 | —C≡C— | 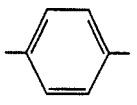 | HE |
| 25 | DE | —O— | 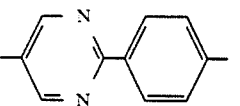 | —C≡C— | 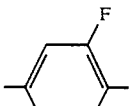 | HE |
| 26 | DE | — | 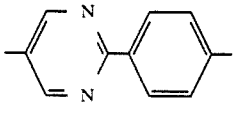 | —C≡C— | 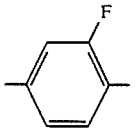 | HE |
| 27 | DE | —O— | 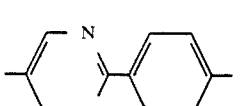 | —OCH₂— | 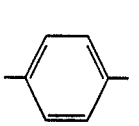 | HE |
| 28 | DE | — | 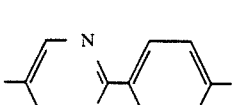 | —OCH₂— | 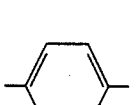 | HE |
| 29 | DE | —O— | 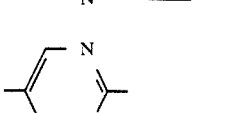 | — | 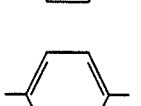 | HE |
| 30 | DE | — | 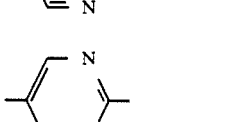 | — | 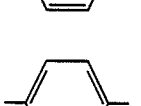 | HE |
| 31 | OC | —O— | 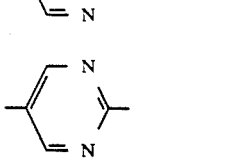 | — | 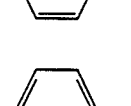 | HE |

TABLE 1-continued

| No. | R | X | A₁ | Y | A₂ | R' |
|---|---|---|---|---|---|---|
| 32 | NO | — | 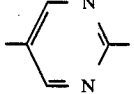 | — |  | HE |

[Notes]
DE: n-C$_{10}$H$_{21}$;
OC: n-C$_8$H$_{17}$;
NO: n-C$_9$H$_{15}$;
HE: n-C$_6$H$_{13}$;
PE: n-C$_5$H$_{11}$.

Compounds of the formula (1) can be produced, for example, according to the following equations. [In the following, m and n are integers of 1 or 2, and p and q are integers of 0~4, wherein p+q≦4.]

[A] In case where A₁ is

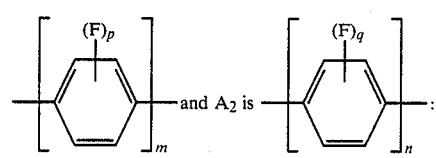 and A₂ is 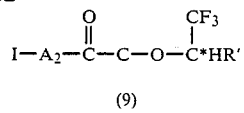:

(A-i) Wherein Y is —CO—O—:

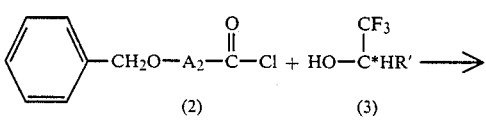 I

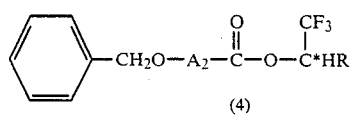
(4)

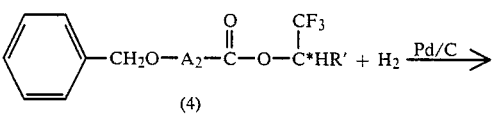 II

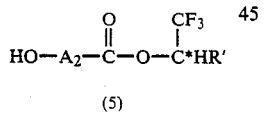
(5)

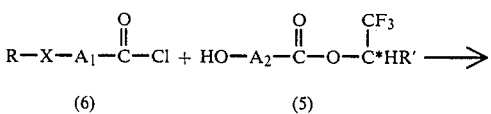 III

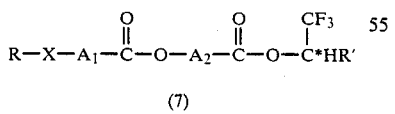
(7)

(A-ii) Wherein Y is —≡C—:

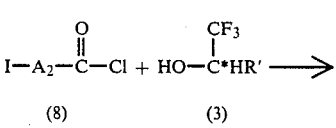 IV

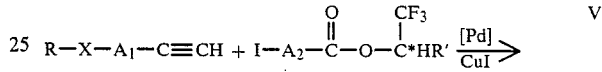
(9)

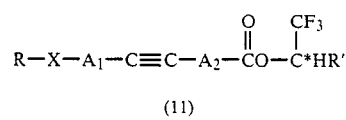 V

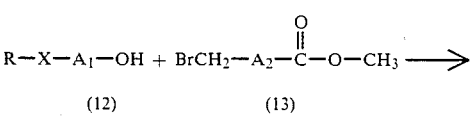
(11)

(A-iii) Wherein Y is —O—CH₂—:

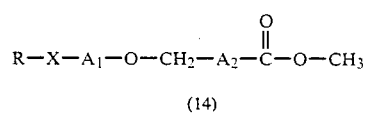 VI

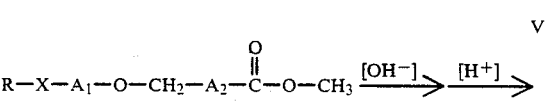
(14)

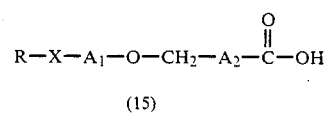 VII

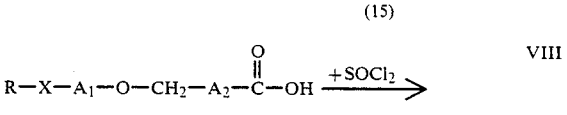
(15)

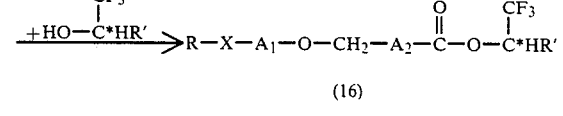 VIII (16)

[B] In case where A₁ and A₂ are, respectively,

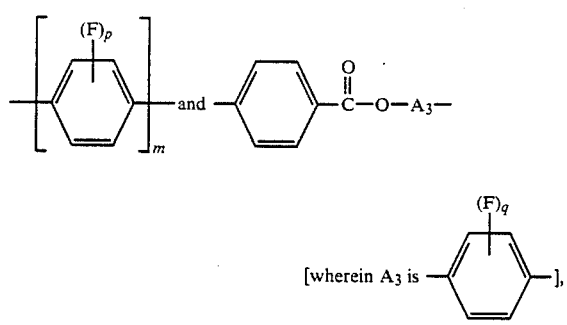

[wherein $A_3$ is 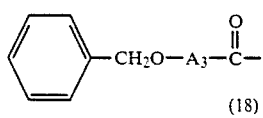], and Y is —C≡C—:

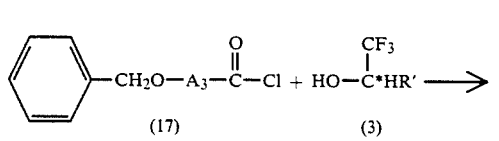
(17)    (3)
IX

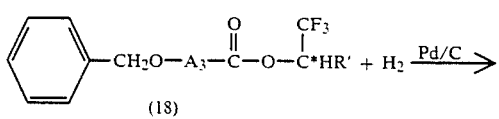
(18)
X

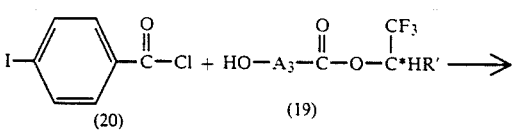
(19)

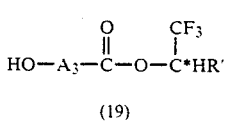
(20)    (19)
XI

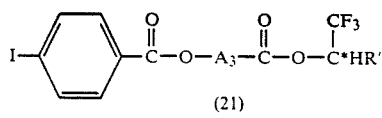
(21)

R—X—A$_1$—C≡CH + 
(10)
XII

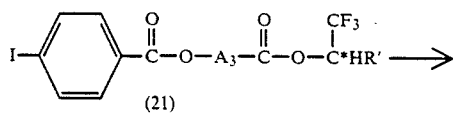
(21)

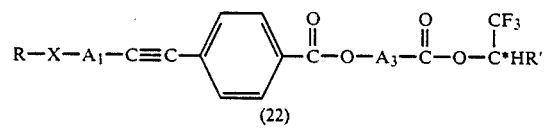
(22)

[C] In case where $A_1$ is

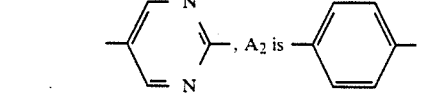 and $A_2$ is 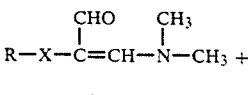:

(C-i) Wherein Y is —C≡C—: the same as the equations IV~V
(C-ii) Wherein Y is —O—CH$_2$—: the same as the equations VI~VIII
(C-ii) Wherein Y is —CO—O—: the same as the equations I~III

[D] In case where $A_1$ is

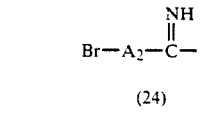, $A_2$ is —⟨⟩— and Y is —(direct bond):

R—X—C=CH—N—CH$_3$ + 
(23)
XIII

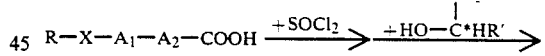
(24)    (25)

R—X—A$_1$—A$_2$—Br $\xrightarrow{+Mg}$ $\xrightarrow{+CO_2}$
(25)
XIV

R—X—A$_1$—A$_2$—COOH
(26)

R—X—A$_1$—A$_2$—COOH $\xrightarrow{+SOCl_2}$ $\xrightarrow{+HO-C^*HR'}$
(26)
XV

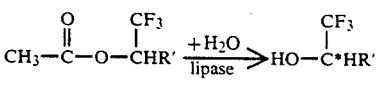
(27)

Optically active 1-alkyl-2,2,2-trifluoroethanols, as the starting materials for these reactions, can be obtained by asymmetric hydrolysis of one optically active isomer from 1-alkyl-2,2,2-trifluoroethyl acetates using lipase.

$$CH_3-\overset{O}{\underset{}{C}}-O-\overset{CF_3}{\underset{}{CHR'}} \xrightarrow[lipase]{+H_2O} HO-\overset{CF_3}{\underset{}{C^*HR'}}$$
(28)    (3)
XVI Compounds of the formula (1) according to this invention include ones which present liquid crystals by themselves, and ones which don't present liquid crystals by themselves but can provide liquid crystal compositions.

Liquid crystal compositions according to the present invention comprise at least one compound represented by the formula (1).

The liquid crystal compositions may contain one or more chiral smectic liquid crystal other than the compound of the formula (1). Examples of suitable chiral spectic liquid crystals include those disclosed in JPN Patent Lay-open No. 135449/1987 [represented by the formula:

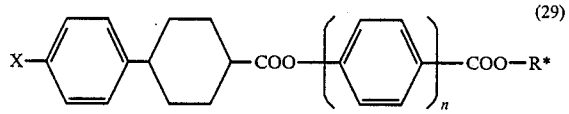

(29)

wherein X is alkyl or alkoxy group containing 6-18 carbon atoms, n is 1 or 2, R* is optically active group containing asymmetric carbon atom], such as p'-(2-methylbutyloxycarbonyl)phenyl ester of trans-4-(p-n-octoxphenyl)cyclohexanecarboxylic acid; JPN Patent application No. 43696/1986 [represented by the formula:

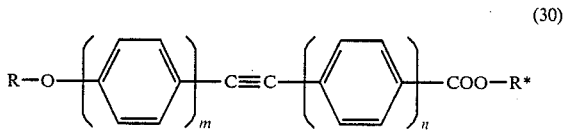

(30)

wherein R is alkyl group containing 6-18 carbon atoms, m and n are integers of 1 or 2, R* is optically active group containing asymmetric carbon atom], such as a compound of the formula:

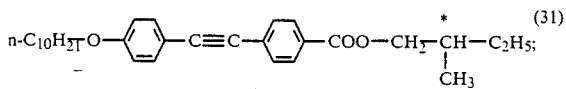

(31)

ferroelectric liquid crystals, such as p'-(2-methylbutoxycarbonyl)phenyl esters of 4-n-alkyloxy-4'-biphenylcarboxylic acids, 2-methylbutyl esters of 4-n-alkyloxy-4'-biphenylcarboxylic acids, p-alkyloxybenzylidene-p'-amino-2-chloro-propylcinnamates, p-alkyloxybenzylidene-p'-amino-2-methylbutylcinnamates and the like; usual chiral smectic liquid crystals, such as 4-(p-alkyloxybiphenyl-p'oxycarbonyl)- 4'-(2-methylbutyloxycarbonyl)-cyclohexanes, p-n-alkyloxybenzylidene-p'-(2-methylbutyloxycarbonyl)anilines, and the like; usual smectic liquid crystals, such as 4-n-alkyloxy-4'-biphenylcarboxylic acid p'-(n-alkyloxy-carbonyl)phenyl esters, 4-n-alkyloxy-4'-biphenylcarboxylic acid n-alkyl esters, compounds represented by the formula:

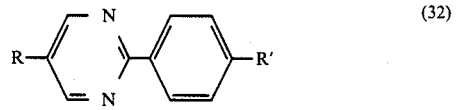

(32)

wherein R and R' are alkyl or alkyloxy groups containing 6-18 carbon atoms; and the like; and combinations of two or more of them.

The liquid crystal compositions may contain pleochroic dyes, such as anthraquinone dyes, azo dyes, and the like.

Content (% by weight) of each component in the liquid crystal compositions are, for example, as follows:
  the compound(s) of the formula (1): usually at least 10%, preferably at least 30%, more preferably 40-80%;
  other smectic liquid crystal(s): usually 0-90%, preferably 0-70%, more preferably 40-60%;
  pleochroic dye(s): usually 0-5%.

The liquid crystal compositions of this invention have the upper limit of the temperature presenting chiral smectic phase (hereinafter referred to as S* phase) [that is phase transition temperature from S* phase into smectic A phase, chiral nematic phase or isotropic liquid phase] of usually 70°-80° C. and the lower limit of the temperature presenting S* phase [that is phase transition temperature from solid into S* phase] of usually from −30° C. to −20° C., and show ferroelectricity within this range.

Liquid crystals, showing ferroelectricity, according to the invention, bring about optical switching phenomena by voltage applying, and can provide rapid responce display devices, such as those described in JPN Lay-open Pat. Nos. 107216/1981 and 118744/1984, and N. A. Clark and S. T. Lagerwall, "Applied Physics Letter" 36,899(1980).

The liquid crystal compositions of this invention can be used as display devices, for instance, by sealing in vacuum into liquid crystal cells having cell distance of 0.5-10 micron m (preferably 0.5-3 micron m), followed by providing polarizers on both sides.

The above liquid crystal cells can be produced by combining, through a spacer, two surface-aligned glass substrates provided with transparent electrodes. Examples of suitable spacers are alumina beads, glass fiber and polyimide film. Alignment can be done by conventional alignment treatment, such as application of polyimide membrane, rubbing treatment, oblique vapor-deposition of $SiO_2$.

Having generally described the invention, a more complete understanding can be obtained by reference to certain specific examples, which are included for purposes of illustration only and not intended to be limiting unless otherwise specified.

Example 1 [Preparation of optically active 4-n-decyloxy-4'-biphenylcarboxylic acid p'-(1-trifluoromethylheptyloxycarbonyl)phenyl ester (Compound No. 3 in Table 1)]

(1) Preparation of optically active 1-trifluoromethylheptyl ester of p-benzyloxybenzoic acid 2.28 g of p-benzyloxybenzoic acid and 10 ml of thionyl chloride were heated for 3 hours under reflux, followed by distilling off excess thionyl chloride to obtain p-benzyloxy-benzoyl chloride. This was used without purification in the following step, as a solution in toluene. Into 2.76 g of 1-trifluoromethylheptanol dissolved in 15 ml of pyridine and cooled with ice bath, was added drop-wise over 30 minutes the toluene solution of the above acid chloride, followed by stirring for 5 hours under heating with 90° C. water bath. After cooling, the resulting solution was acidified with addition of 6N hydrochloric acid and ice, and the organic layer was separated and washed with water, then with saturated aqueous solution of sodium bicarbonate, and again with water, followed by distilling off toluene under reduced pressure. Hexane-soluble matter of the resulting crude product was purified with silica gel colmun to obtain 2.85 g of oily optically active 1-trifluoromethylheptyl ester of p-benzyloxybenzoic acid.

(2) Preparation of optically active 1-trifluoromethylheptyl ester of p-hydroxybenzoic acid 2.50 g of optically active 1-trifluoromethylheptyl ester of p-benzyloxybenzoic acid was dissolved into 50 ml of ethanol, and then hydrogenolyzed under an atmosphere of hydrogen using 0.5 g of 5% Pd/C (palladium/carbon). After separating Pd/C by filtration, ethanol was distilled off to obtain 1.73 g of optically active 1-trifluoromethylheptyl ester of p-hydroxybenzoic acid.

(3) Preparation of Compound No. 3

1.77 g of 4-n-decyloxy-4'-biphenylcarboxylic acid and 10 ml of thionyl chloride were heated for 5 hours under reflux, followed by distilling off excess thionyl chloride to obtain 4-n-decyloxy-4'-biphenylcarboxylic acid chloride. This was used without purification in the following step, as a solution in toluene. Into 1.45 g of 1-trifluoromethylheptyl ester of optically active p-hydroxybenzoic acid dissolved in 10 ml of pyridine and cooled with ice bath, was added drop-wise over 30 minutes the toluene solution of the above acid chloride, followed by stirring for 5 hours under heating with 90° C. water bath. After cooling, the resulting solution was acidified with addition of 6N hydrochloric acid and ice, and the organic layer was separated and washed with water, then with saturated aqueous solution of sodium bicarbonate, and again with water, followed by distilling off toluene under reduced pressure. Hexane-soluble matter of the resulting crude product was purified with silica gel colmun, followed by recrystallizing twice from ethanol to obtain 1.95 g of optically active p'-(1-trifluoromethylheptyloxycarbonyl)phenyl ester of 4-n-decyloxy-4'-biphenyl carboxylic acid.

Figure 2:
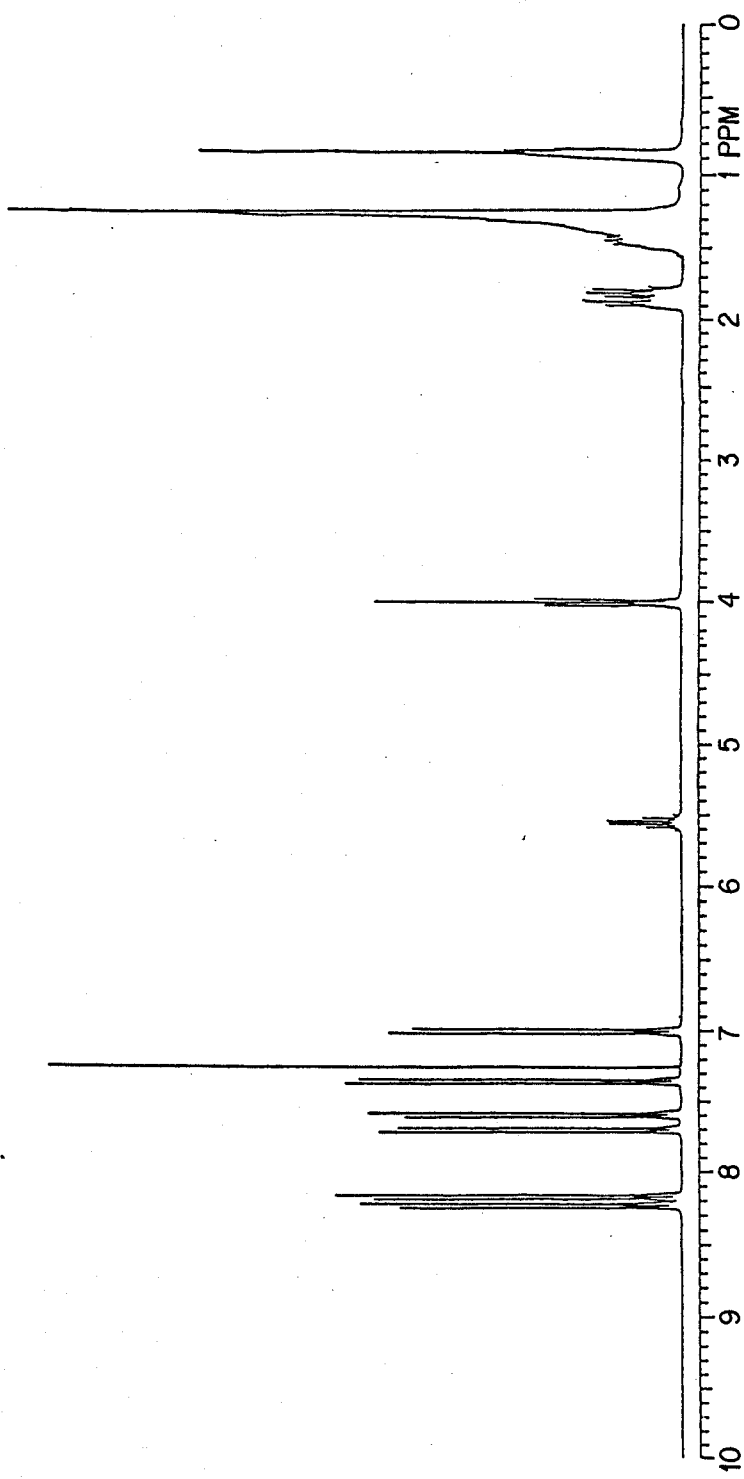
Figure 3:
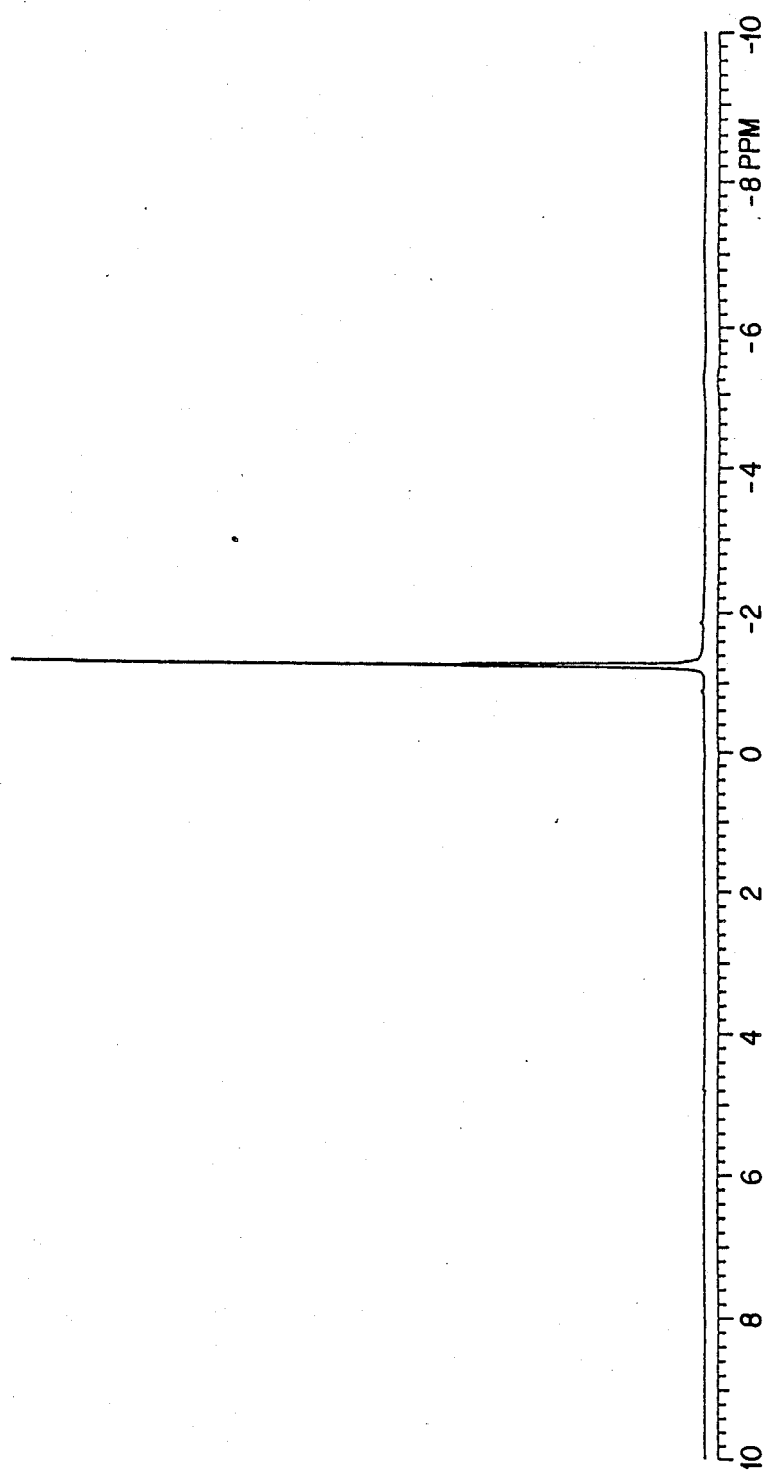

The structure of the compound was confirmed with analysis of NMR (nuclear magnetic resonance), MS (mass spectrum) and IR (infrared adsorption). IR spectrum, H-NMR spectrum and F-NMR spectrum of the compound were as shown in FIG. 1, FIG. 2 and FIG. 3, respectively.

Example 2 [Preparation of optically active 4-n-decyloxy-4'-biphenylcarboxylic acid p'-(1-trifluoromethylundecyloxycarbonyl)phenyl ester (Compound No. 5 in Table 1)]

Example 1 was repeated except that 3.60 g of 1-trifluoromethylundecanol was used instead of 2.76 g of 1-trifluoromethylheptanol. There was obtained 2.83 g of Compound No. 5.

Example 3 [Preparation of Compound No. 12 in Table 1]

(1) Preparation of p-n-decyloxy-m-fluorophenylacetylene (i) Into 350 ml of water, were added 24.5 g of o-fluorophenol and 14.4 g of potassium hydroxide. After cooling to a temperature not more than 10°C., 55.6 g of iodine was added thereto, followed by stirring over 24 hours. The resulting oily product was extracted with ether, and then washed with an aqueous solution of sodium thiosulfate and water. Thereafter, ether was distilled off, followed by distilling under reduced pressure to obtain 16 g of liquid p-iodo-o-fluoro-phenol [b.p. (5 mm Hg)=155°–157° C.].

(ii) 3.0 g of this compound was dissolved into 30 ml of dimethylsulfoxide, and then 0.83 g of potassium hydroxide and 2.7 g of n-decylbromide were added thereto, followed by stirring over 24 hours. The resulting product was thrown into water and extracted with 100 ml of hexane. After washing with water and drying, the product was passed through a silica gel-packed short column, followed by distilling off hexane to obtain 3.9 g of liquid p-n-decyloxy-m-fluoro-iodo-benzene.

3.9 g of this compound and 0.7 g of propalgyl alcohol were dissolved into 10 ml of triethyl amine, and then 40 mg of copper(I) iodide and 85 mg of dichlorobis (triphenylphosphine) palladium(II) were added thereto, followed by stirring over 24 hours under an atmosphere of nitrogen. The resulting product was thrown into water and extracted with 50 ml of ether. The product was washed with a dilute hydrochloric acid, then with water, subsequently with an aqueous solution of sodium bicarbonate and again with water, followed by drying. Thereafter ether was distilled off, and then the product was dissolved in hexane and the solution was passed through an activated alumina-packed short column, followed by distilling off hexane to obtain 2.40 g of the following compound.

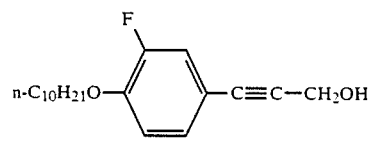

(iii) 2.40 g of this compound was dissolved into 30 ml of benzene, and then 2.40 g of manganese dioxide and 1.0 g of potassium hydroxide were added thereto, followed by stirring over 24 hours. After filtering off solid matter and then distilling off benzene, the residue was dissolved into hexane and the solution was passed through an activated alumina-packed short column, followed by distilling off hexane to obtain 2.00 g of liquid p-n-decyloxy-m-fluoro-penyl-acetylene.

(2) Preparation of optically active 1-trifluoromethylheptyl ester of 4-iodo-4'-biphenylcarboxylic acid.

3.30 g of 4-iodo-4'-biphenylcarboxylic acid and 10 ml of thionyl chloride were heated for 6 hours under reflux, followed by distilling off excess thionyl chloride to obtain 4-iodo-4'-biphenylcarboxylic acid chloride. This was used without purification in the following step, as a solution in toluene. Into 1.80 g of 1-trifluoromethylheptanol dissolved in 20 ml of pyridine and cooled with ice bath, was added drop-wise over 30 minutes the toluene solution of the above acid chloride, followed by stirring for 5 hours under heating with 90° C. water bath. After cooling, the resulting solution was acidified with addition of 6N hydrochloric acid and ice, and the organic layer was separated and washed with water, then with saturated aqueous solution of sodium bicarbonate, and again with water, followed by distilling off toluene under reduced pressure. Hexane-soluble matter of the resulting crude product was purified with silica gel column to obtain 2.85 g of oily optically active 1-trifluoromethylheptyl ester of 4-iodo-4'-biphenylcarboxylic acid.

(3) Preparation of Compound No. 12

1.40 g of p-n-decyloxy-m-fluorophenylacetylene and 2.45 g of optically active 1-trifluoromethylheptyl ester of 4-iodo-4'-biphenylcarboxylic acid were dissolved into 30 ml of triethyl amine. Under an atmosphere of nitrogen, 19 mg of copper(I) iodide and 35 mg of dichlorobis (triphenylphosphine) palladium(II) were added thereto, following by stirring over 24 hours. The resulting product was thrown into water and extracted with 100 ml of ether. The product was washed with a dilute hydrochloric acid and with water, followed by drying. Thereafter ether was distilled off, and then the product was dissolved in hexane and the solution was passed through a silica gel-packed short column, followed by distilling off hexane. The residue was recrystalized from ethanol to obtain 2.65 g of Compound No. 12.

Figure 4:
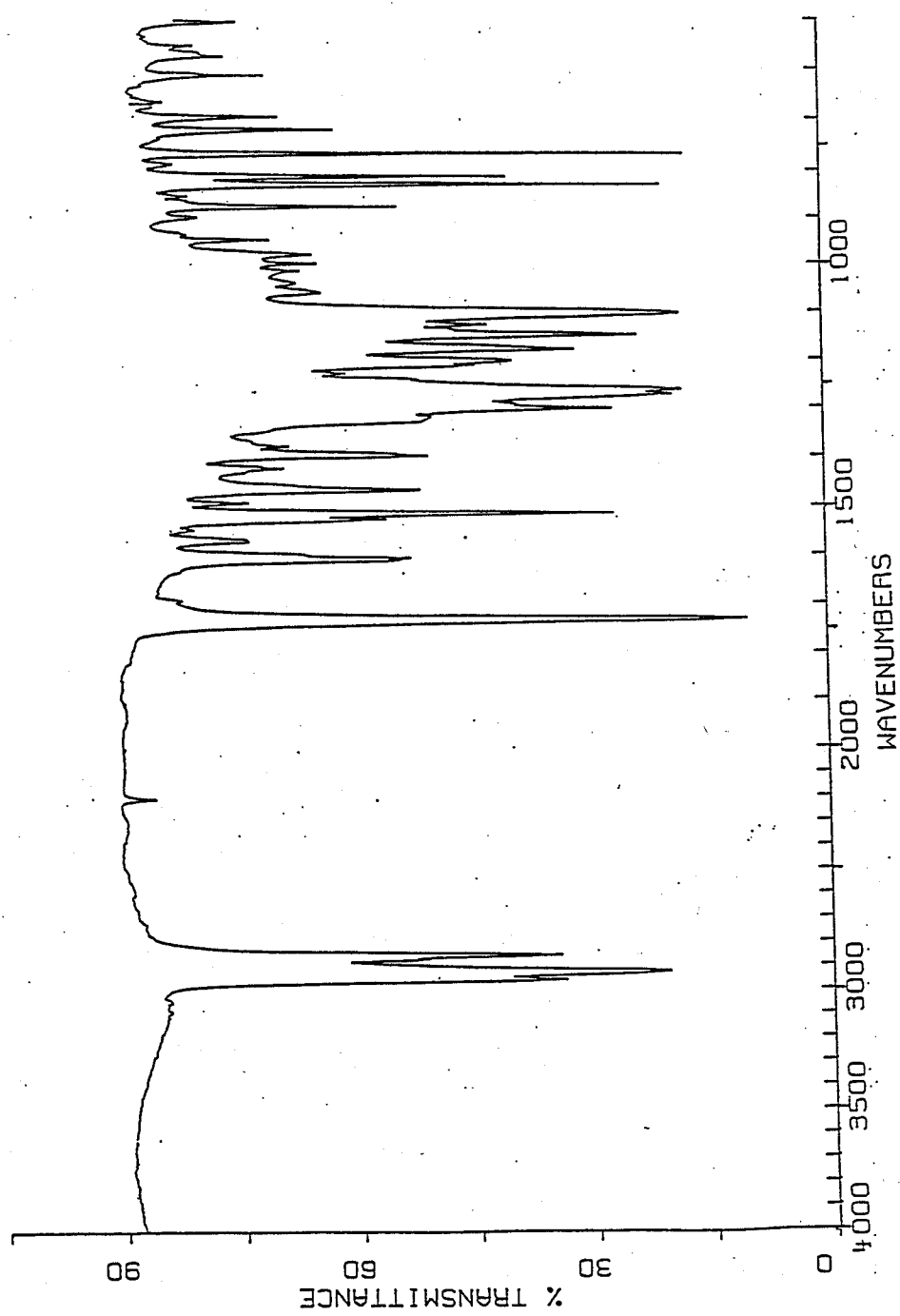
FIG. 4, FIG. 5 and FIG. 6 are IR spectrum, H-NMR spectrum and F-NMR spectrum, respectively, of a liquid crystal compound of Example 3.
Figure 5:
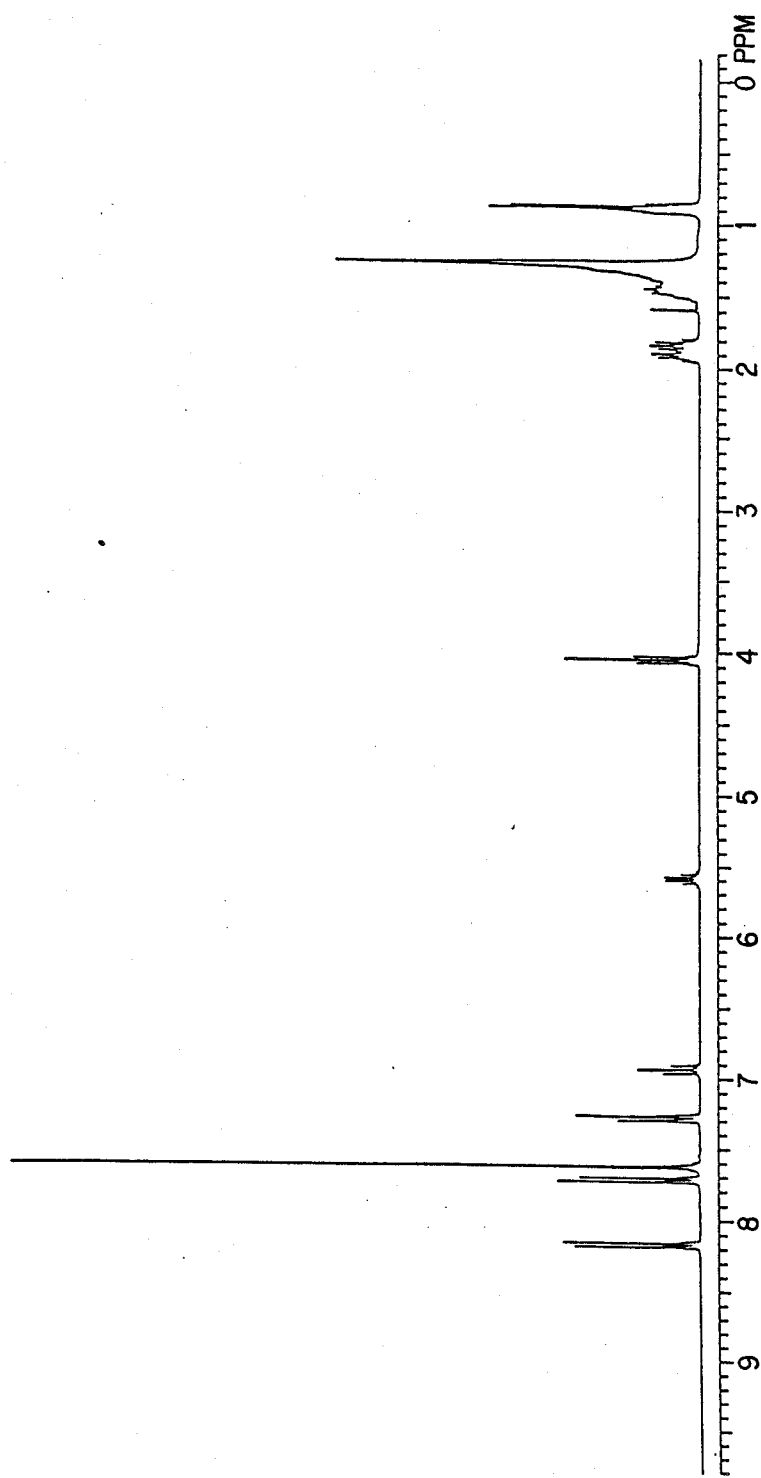
Figure 6:
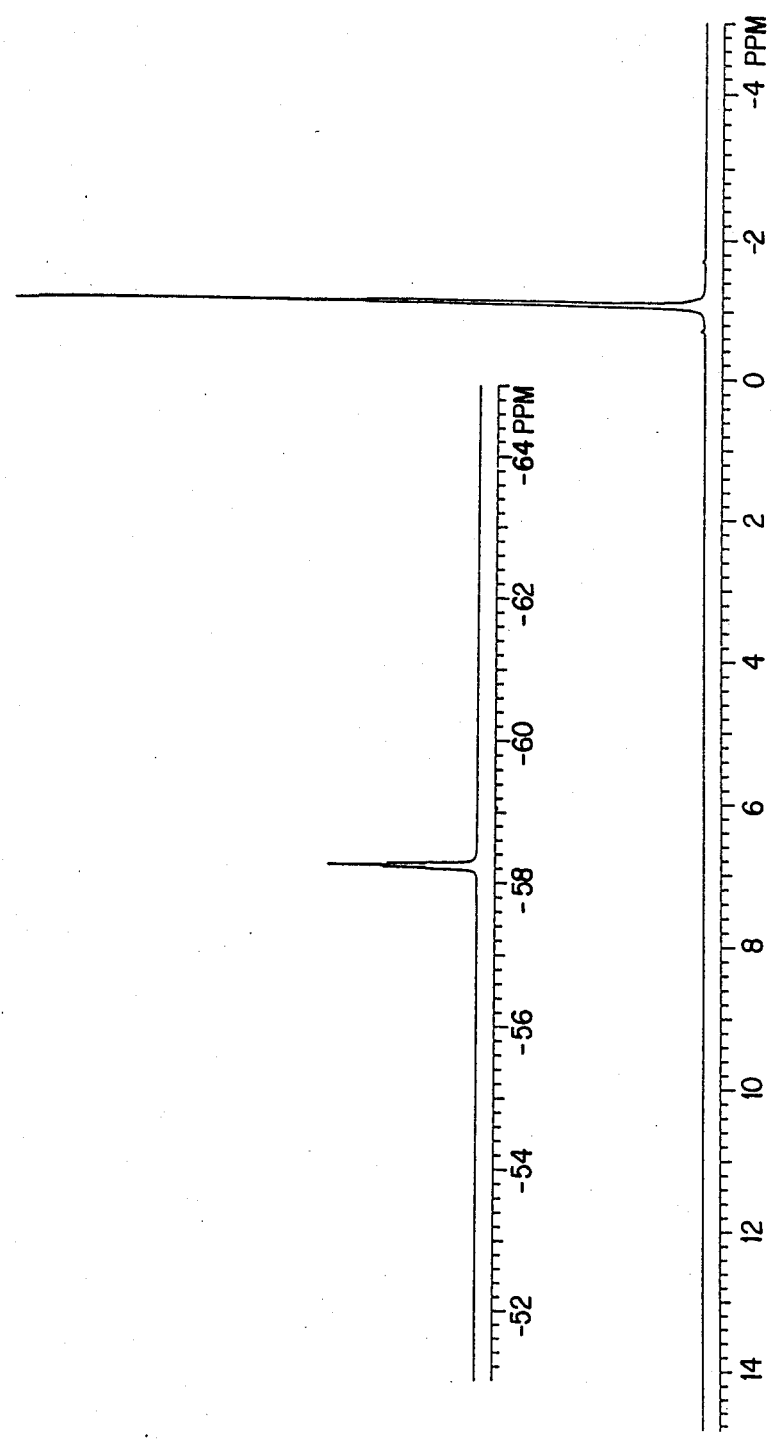

The structure of the compound was confirmed with analysis of NMR, MS and IR., IR spectrum, H-NMR spectrum and F-NMR spectrum of the compound were as shown in FIG. 4, FIG. 5 and FIG. 6, respectively.

Example 4 [Preparation of Compound No. 15 in Table 1]

(1) Preparation of optically active p'-(1-trifluoromethylheptyloxycarbonyl) phenyl ester of p-iodo-benzoic acid Example 1 was repeated except that 1.30 g of p-iodobenzoic acid and 5 ml of thionyl chloride were heated for 6 hours under reflux, instead of heating 1.77 g of 4-n-decyloxy-4'-biphenylcarboxylic acid and 10 ml of thionyl chloride for 5 hours, and that 1.50 g of optically active 1-trifluoromethylheptyl ester of p-hydroxybenzoic acid dissolved in 0.8 g of pyridine was used instead of 1.45 g of optically active 1-trifluoromethylheptyl ester of p-hydroxybenzoic acid dissolved in 10 ml of pyridine. There was obtained 2.33 g of optically active p'-(1-trifluoro-methylheptyloxycarbonyl) phenyl ester of p-iodo-benzoic acid.

(2) Preparation of Compound No. 15

1.40 g of p-n-decyloxy-m-fluoro-phenyl-acetylene prepared as in Example 3(1) and 2.65 g of optically active p'-(1-trifluoro-methylheptyloxycarbonyl) phenyl ester of p-iodobenzoic acid were dissolved into 30 ml of triethyl amine. Under an atmosphere of nitrogen, 19 mg of copper(I) iodine and 35 mg of dichlorobis (triphenylphosphine)palladium(II) were added thereto, followed by stirring over 24 hours. The resulting product was thrown into water and extracted with 100 ml of ether. The product was washed with a dilute hydrochloric acid and with water, followed by drying. Thereafter ether was distilled off, and then the product was dissolved in hexane and the solution was passed through a silica gel-packed short column, followed by distilling off hexane. The residue was recrystalized from ethanol to obtain 2.73 g of Compound No. 15.

Figure 7:
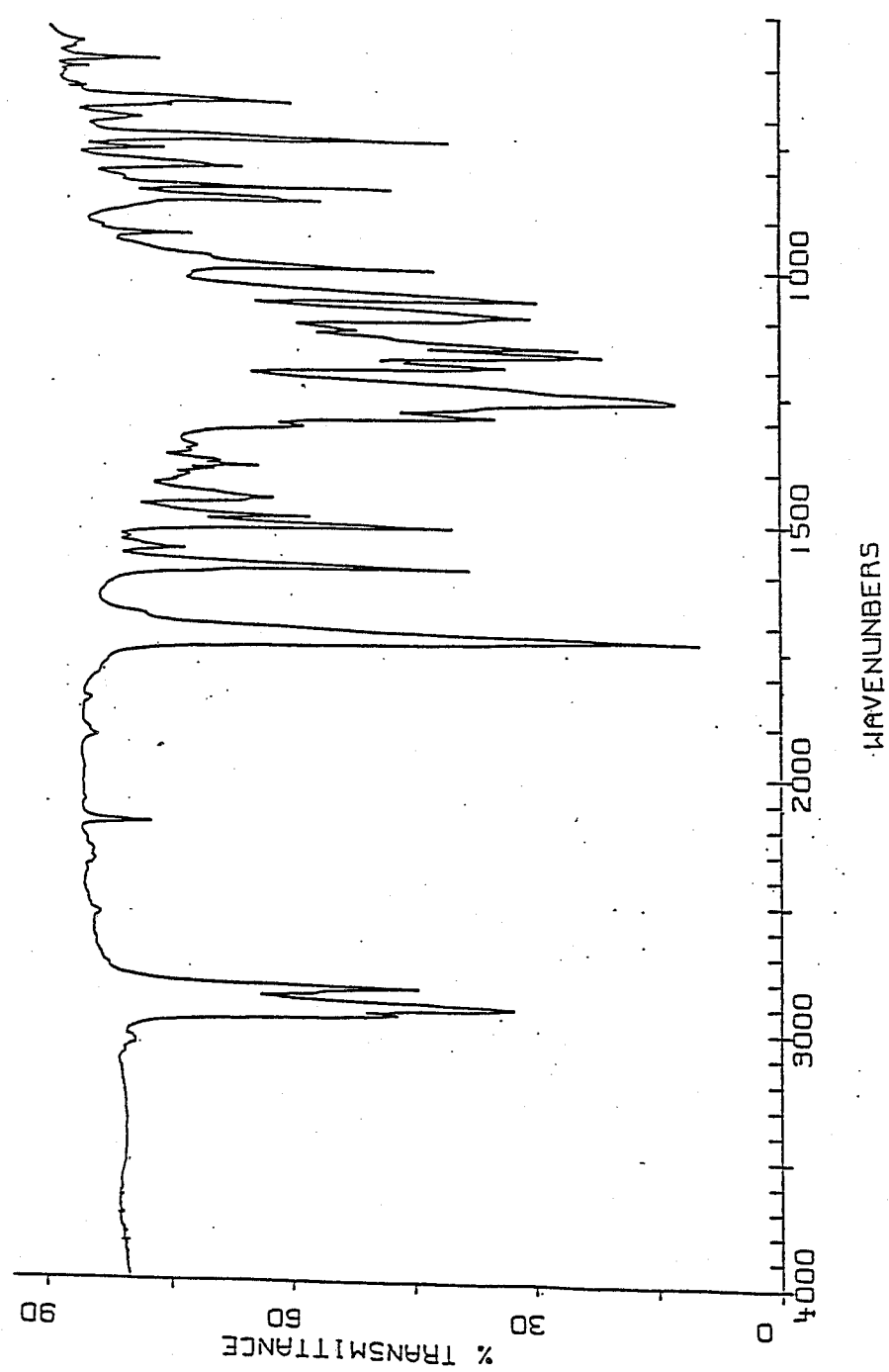
FIG. 7, FIG. 8 and FIG. 9 are IR spectrum, H-NMR spectrum and F-NMR spectrum, respectively, of a liquid crystal compound of Example 4.
Figure 8:
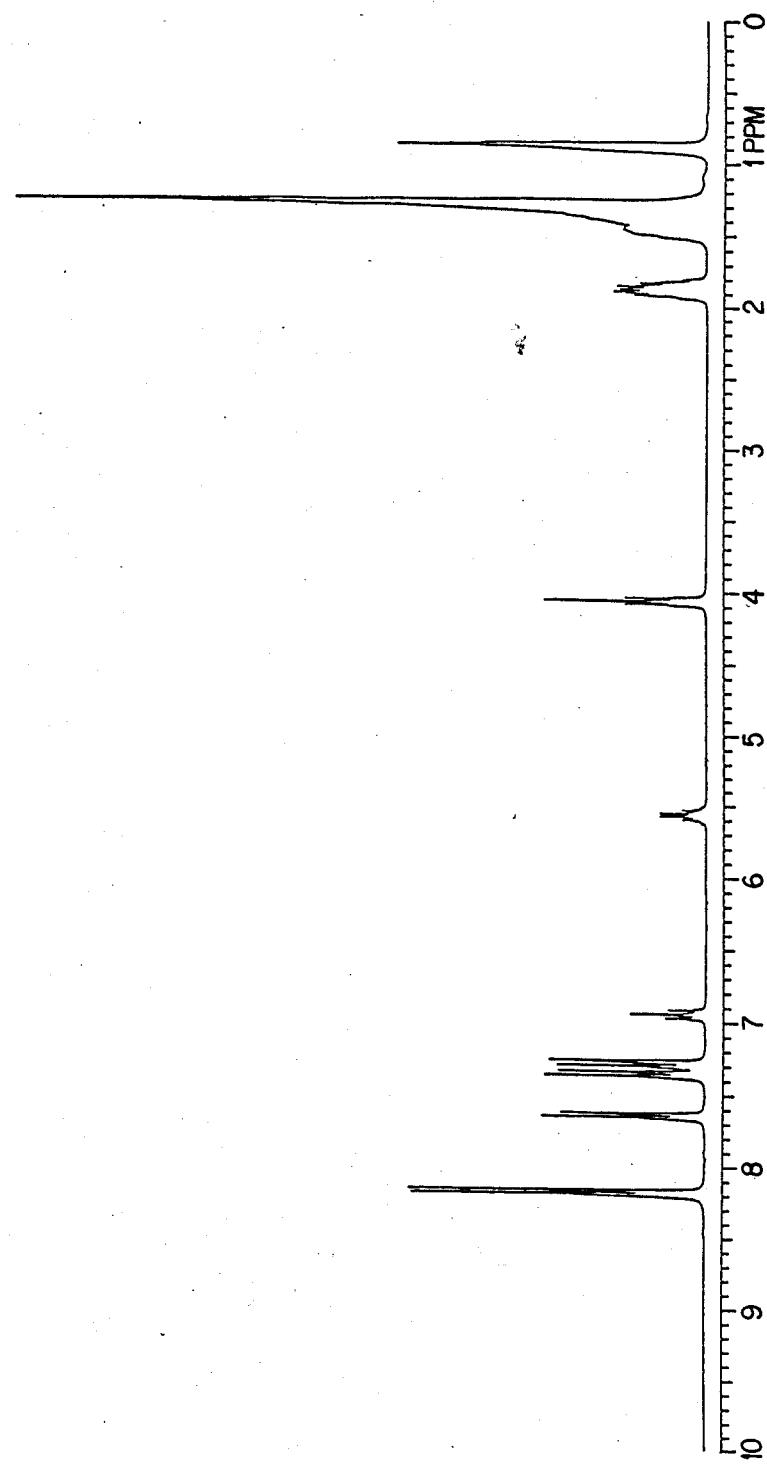
Figure 9:
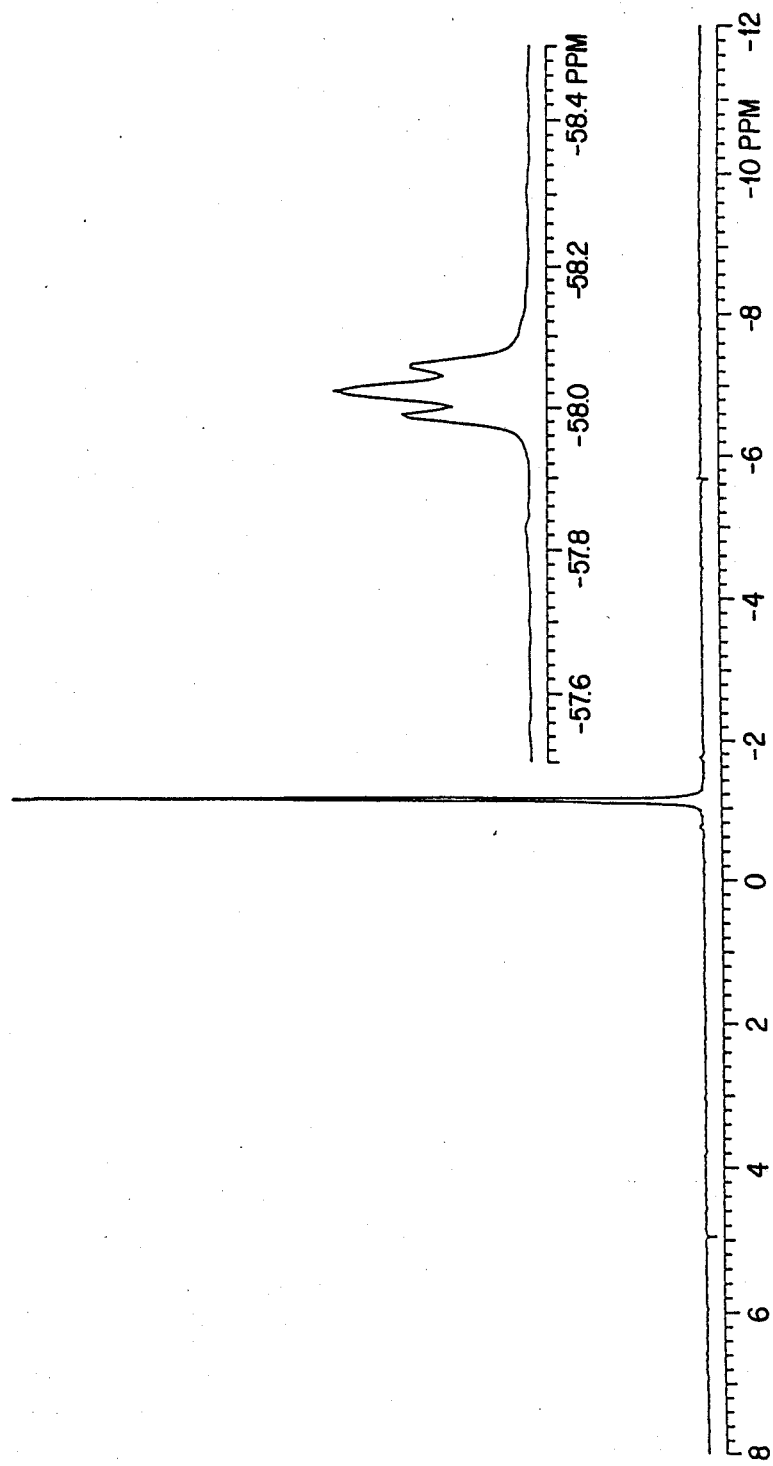

The structure of the compound was confirmed with analysis of NMR, MS and IR. IR spectrum, H-NMR spectrum and F-NMR spectrum of the compound were as shown in FIG. 7, FIG. 8 and FIG. 9, respectively.

Example 5 [Preparation of Compound No. 18 in Table 1]

(1) Preparation of 4'-n-decyloxy-4-biphenyl-p-(methoxycarbonyl)benzylether

Into 50 ml of dimethylsulfoxide, were added 3.30 g of 4'-n-decyloxy-4-hydroxybiphenyl, 2.20 g of methyl p-(bromomethyl)benzoate and 0.7 g of potassium hydroxide, followed by stirring over 24 hours at room temperature. The reaction product was thrown into water, and the resulting precipitates were filtered and dried, followed by recrystallizing from toluene to obtain 4.1 g of white crystals of 4'-n-decyloxy-4-biphenyl-p-(methoxycarbonyl)benzylether.

(2) Preparation of Compound No. 18

(i) 4.00 g of 4'-n-decyloxy-4-n-biphenyl-p-(methoxycarbonyl)benzylether and 1.00 g of potassium hydroxide were refluxed in 50 ml of 10% water-containing ethanol for 5 hours. After cooling, the resulting precipitates were filtered and dried. The precipitates were added to a mixture of 200 ml of 1N-hydrochloric acid and 200 ml of toluene, followed by, refluxing for 2 hours. After cooling, the resulting precipitates were filtered to obtain 4'-n-decyloxy-4-biphenyl-p-(carboxy)-benzylether, which was used in the following step without purification.

(ii) 2.30 g of 4'-n-decyloxy-4-biphenyl-p-(carboxy)-benzylether and 10 ml of thionyl chloride were heated for 5 hours under reflux, followed by distilling off excess thionyl chloride to obtain an acid chloride. This was used without purification in the following step, as a solution in toluene.

Into 0.95 g of optically active 1-trifluoromethylheptanol dissolved in 20 ml of pyridine and cooled with ice bath, was added drop-wise over 30 minutes the toluene solution of the above acid chloride, followed by stirring for 5 hours under heating with 90° C. water bath. After cooling, the resulting solution was acidified with addition of 6N hydrochloric acid and ice, and the organic layer was separated and washed with water, then with saturated aqueous solution of sodium bicarbonate, and again with water, followed by distilling off toluene under reduced pressure. Hexane-soluble matter of the resulting crude product was purified with silica gel column, followed by recrystallizing twice from ethanol to obtain 1.96 g of Compound No. 18.

Figure 10:
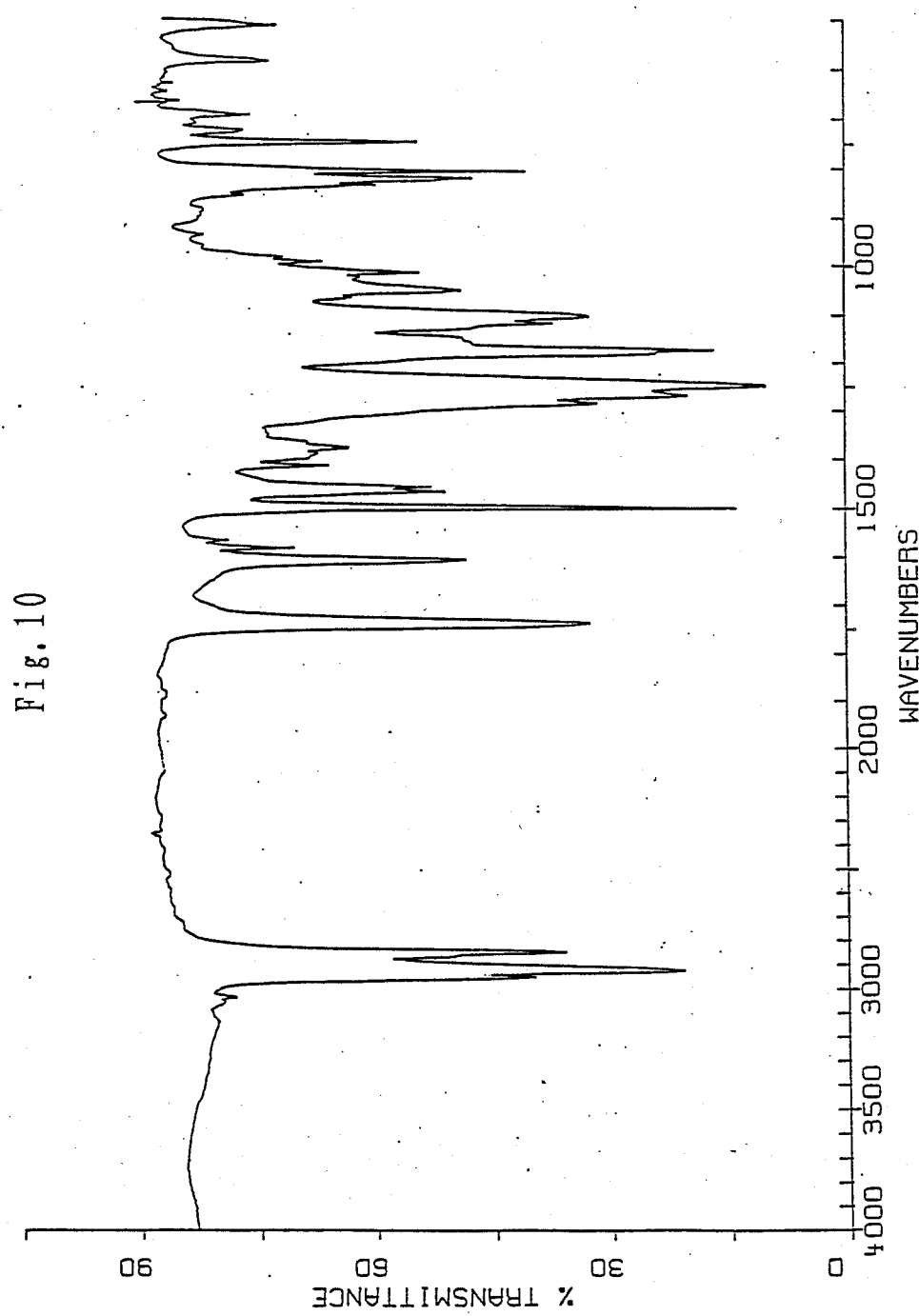
FIG. 10, FIG. 11 and FIG. 12 are IR spectrum, H-NMR spectrum and F-NMR spectrum, respectively, of a liquid crystal compound of Example 5.
Figure 11:
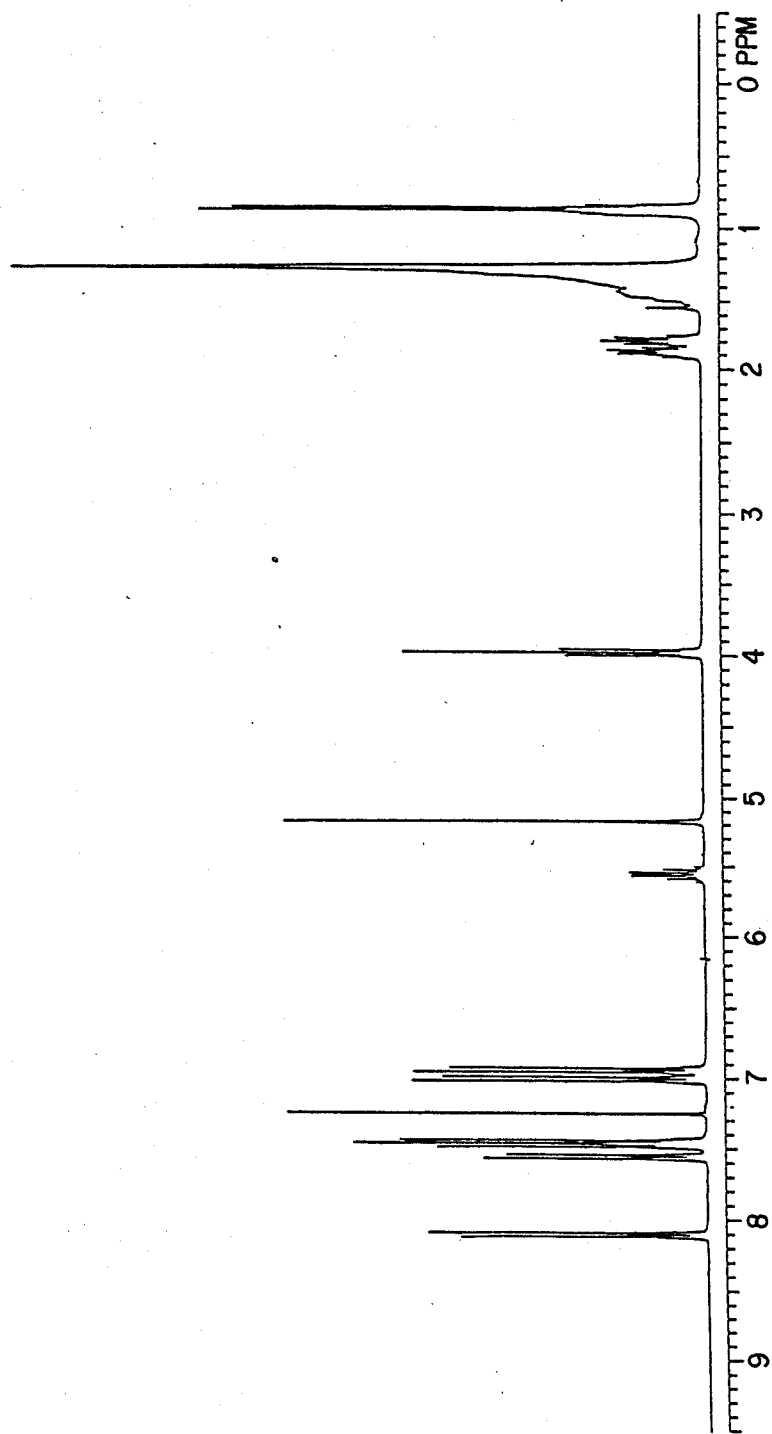
Figure 12:
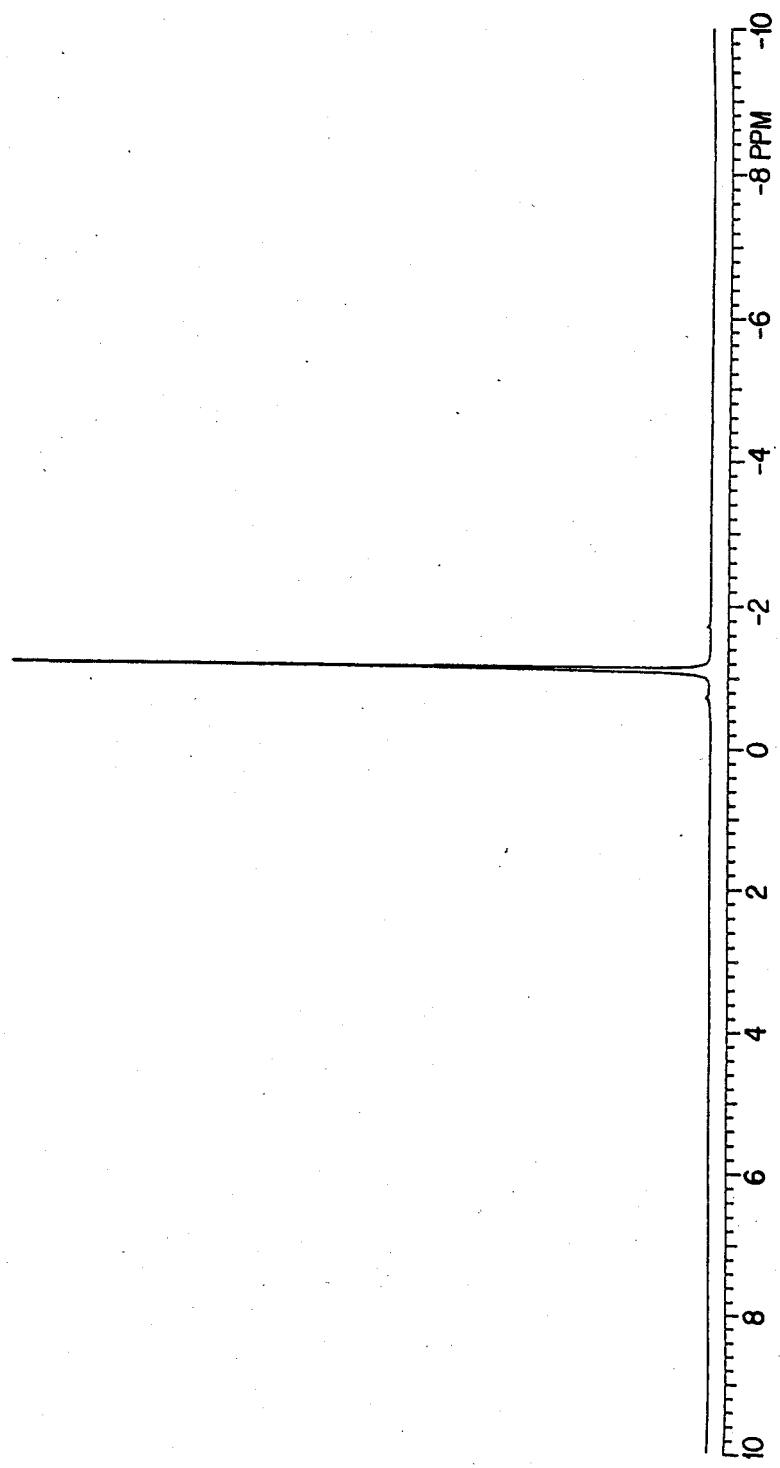

The structure of the compound was confirmed with analysis of NMR, MS and IR. IR spectrum, H-NMR spectrum and F-NMR spectrum of the compound were as shown in FIG. 10, FIG. 11 and FIG. 12, respectively.

Characteristics [phase transition temperatures and values of spontaneous polarization (hereinafter referred to as Ps)] of the compounds obtained according to Examples 1-5 were as shown in Table 2.

TABLE 2

| Example No. | Phase transition temperature, °C. | Ps, nC/cm² |
|---|---|---|
| 1 | $C \underset{<-20}{\overset{52}{\rightleftarrows}} S_C^* \overset{95}{\rightleftarrows} S_A \overset{112}{\rightleftarrows} I$ | 190 |

TABLE 2-continued

| Example No. | Phase transition temperature, °C. | Ps. nC/cm² |
|---|---|---|
| 2 | $C \underset{<0}{\rightleftarrows} S_C^* \xleftrightarrow{82} S_A \xleftrightarrow{95} I$ | 70 |
| 3 | $C \xleftrightarrow{76} I$ | — |
| 4 | $C \underset{<0}{\overset{45}{\rightleftarrows}} S_1^* \xleftrightarrow{74} S_C^* \xleftrightarrow{76} S_A \xleftrightarrow{82} I$ | 70 |
| 5 | $C \underset{<-20}{\rightleftarrows} S_1^* \xleftrightarrow{74} S_C^* \xleftrightarrow{108} I$ | 100 |

In Table 2, C stand for a crystal phase, $S_C^*$ for a chiral smectic C phase, $S_A$ for a smectic A phase, $S_1^*$ for an unidentified ferroelectric smectic phase, and I for an isotropic phase.

Compound No. 3 has the value of spontaneous polarization at lower temperature (near the room temperature), as compared with the above-mentioned known Compound B, having mesomorphic temperature range of 72.5°–121.5° C.

Examples 6 to 11

Liquid crystal compositions were prepared, according to the formulation (parts by weight) shown in Table 3, by blending the ingredients (Compound No. 2, 3, 12, 15 or/and 18, with the following compounds) under heating.

Compounds A and B: as mentioned above.

Compounds C, D, E, F, G and H: compounds represented by the formula (32), wherein R and R' are as follows:

| Compound | R | R' |
|---|---|---|
| C | n-heptyl | n-heptyl |
| D | n-octyl | n-heptyl |
| E | n-octyl | n-octyl |
| F | n-nonyl | n-heptyl |
| G | n-nonyl | n-octyl |
| H | n-octyl | n-nonyl |

Characteristics of these compositions were as shown in Table 3.

TABLE 3

| Example No. | 6 | 7 | 8 | 9 | 10 | 11 |
|---|---|---|---|---|---|---|
| Compound No. 2 | 50 | 60 | — | — | — | — |
| Compound No. 3 | — | — | — | — | — | 10 |
| Compound No. 7 | — | — | 13 | — | — | — |
| Compound No. 15 | — | — | — | 15 | — | 10 |
| Compound No. 18 | — | — | — | — | 20 | 5 |
| Compound A | 30 | 25 | — | — | — | — |
| Compound B | 20 | 15 | — | — | — | — |
| Compound C | — | — | 12 | 7 | 10 | — |
| Compound D | — | — | 20 | 8 | 10 | — |
| Compound E | — | — | 20 | 15 | 20 | — |
| Compound F | — | — | 20 | 25 | 20 | — |
| Compound G | — | — | 15 | 30 | 20 | 30 |
| Compound H | — | — | — | — | — | 45 |
| Temperature range of $S_C^*$ phase, °C. | −30 ~70 | −23 ~85 | 10 ~55 | 15 ~85 | 5 ~60 | 17 ~61 |
| Ps, nC/cm² | 30 | 40 | 15 | 20 | 25 | 30 |

Example 12

An optical switching element was produced by introducing the liquid crystal composition of Example 11 into cells of 2 micron m thickness, provided with transparent electrodes, which has been coated with polyvinyl alcohol and surface-aligned by rubbing. This element was placed between two crossing polarizers, and electric voltage was applied. Responce time, measured by changes in the intencity of transmitted light with application of 20 V voltage, was about 50 micro-second at 25 C.

Liquid crystal compounds and liquid crystal compositions according to this invention have unexpected effects as follows:

(1) They can provide a chiral smectic phase showing ferroelecticity at a lower temperature, such as the room temperature or the neighborhood thereof, and high value of spontaneous polarization.

(2) They are highly stable toward light, heat, water and chemical attack.

(3) They show a chiral smectic phase of ferroelecticity over a wide range of temperature, and can provide rapid responce.

What is claimed as new and desired to be secured by Letters Patent is:

1. A liquid crystal compound represented by the general formula (1):

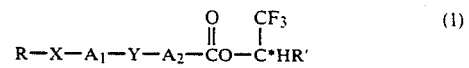

wherein R and R' are independently selected from alkyl groups containing 1~20 carbon atoms; X is —O—, —O—CO—O— or direct bond; A₁ and A₂ are independently cyclic groups selected from the group consisting of

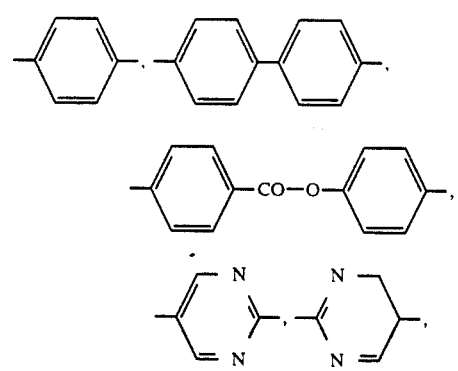

-continued

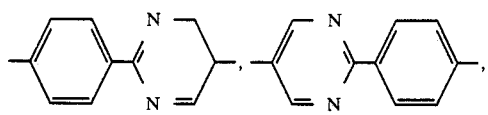

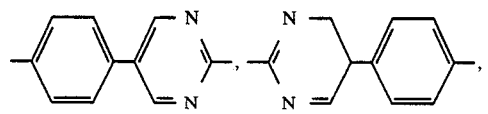

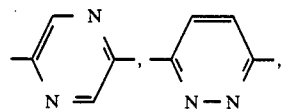

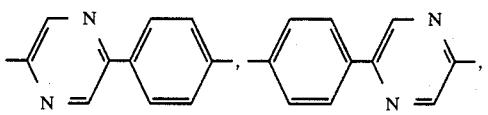

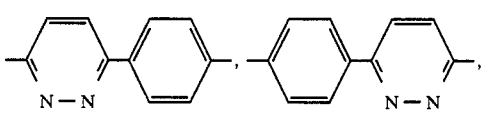

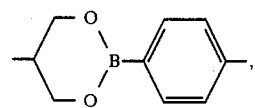

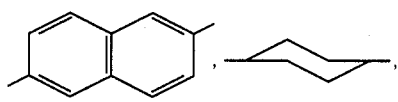

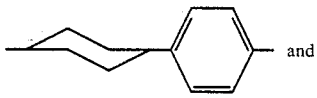

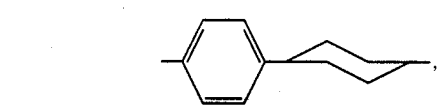

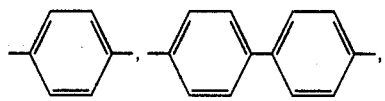

said cyclic groups may be substituted with 1~4 fluorine, chlorine or bromine atoms, or 1 or 2 substituent groups selected from the group consisting of cyano, nitro and trifluoromethyl groups; and Y is —CO—O—, —O—CO—, —C≡C—, —CH₂O—, —OCH₂—, —CH=N—, —N=CH—, —N=N—, —CH₂S—, or —SCH₂—; and * represents asymmetric atom providing optical activity.

2. The compound of claim 1, wherein Y is selected from the group consisting of —CO—O—, —O—CO—, —C≡C—, —CH₂O—, and —OCH₂—.

3. The compound of claim 1, wherein A₁ and A₂ are independently cyclic groups selected from the group consisting of -continued

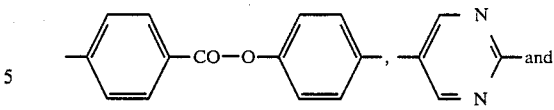

said cyclic groups may be substituted with 1~4 fluorine atoms.

4. The compound of claim 1, wherein A₁ is selected from the group consisting of

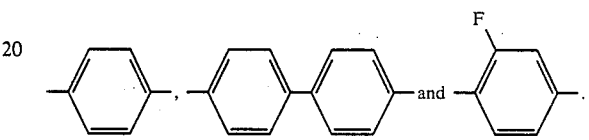

5. The compound of claim 1, wherein A₂ is selected from the group consisting of

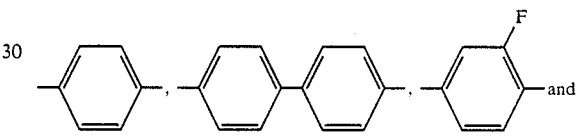

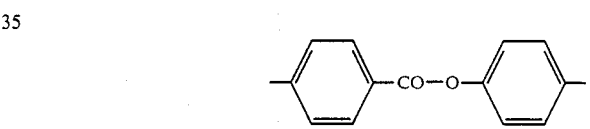

6. The compound of claim 1, wherein R is straight-chain alkyl group containing 6~14 carbon atoms.

7. The compound of claim 1, wherein R' is alkyl group containing 3~10 carbon atoms.

8. The compound of claim 1, wherein X is 0 or direct bond.

9. The compound of claim 1, which is optically active p'-(1-trifluoromethylheptyloxycarbonyl)phenyl ester of 4-n-decyloxy-4'-biphenylcarboxylic acid.

10. The compound of claim 1, which is optically active p'-(1-trifluoromethylundecyloxycarbonyl)phenyl ester of 4-n-decyloxy-4'-biphenylcarboxylic acid.

11. The compound of claim 1, which is optically active 1-trifluoromethylheptyl ester of 4-(p-n-decyloxy-m-fluorophenyl-acetylenyl)-4'-biphenylcarboxylic acid.

12. The compound of claim 1, which is optically active p'-(1-trifluoromethylheptyloxycarbonyl)phenyl ester of 4-(p-n-decyloxy-m-fluoro-phenyl-acetylenyl)-benzoic acid.

13. The compound of claim 1, which is optically active 4'-n-decyloxy-4-biphenyl-p-(1-trifluoromethyl-heptyl-oxycarbonyl)-benzyl ether.

14. A liquid crystal composition, containing as components thereof a mixture of a plurality of liquid crystal compounds, said liquid compounds comprising at least one compound represented by the general formula (1):

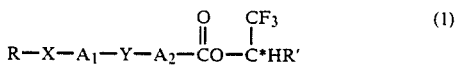
(1)

wherein R and R' are independently selected from alkyl groups containing 1~20 carbon atoms; X is —O—, —O—CO—O— or direct bond; $A_1$ and $A_2$ are independently cyclic groups selected from the group consisting of

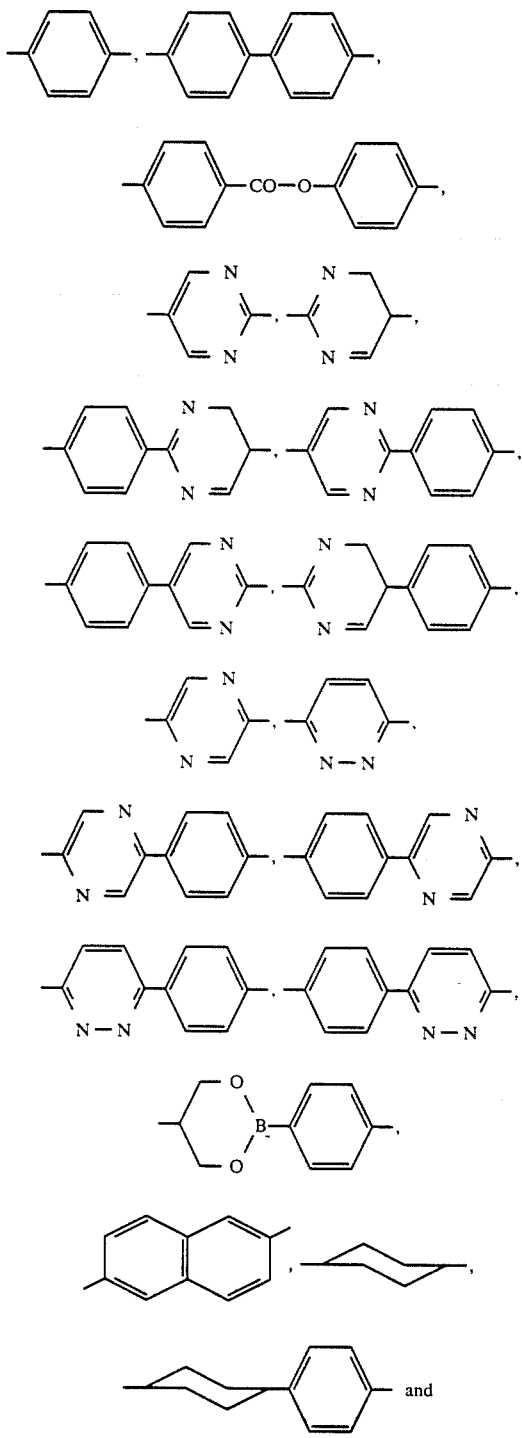

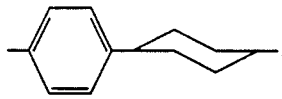

said cyclic groups may be substituted with 1~4 fluorine, chlorine or bromine atoms, or 1 or 2 substituent groups selected from the group consisting of cyano, nitro and trifluoromethyl groups; and Y is —CO—O—, —O—CO—, —C≡C—, —CH₂O—, —OCH₂—, —CH=N—, —N=CH—, —N=N—, —CH₂S—, or —SCH₂— and * represents asymmetric atom providing optical activity.

15. The composition of claim 14, which further contains at least one other liquid crystal selected from the group consisting of ferroelectric liquid crystals and nonferroelectric chiral smectic liquid crystals.

16. The composition of claim 14 which further contains one or more compounds represented by the formulae:

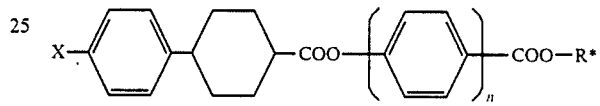

(wherein X is an alkyl or alkoxy group containing 6~18 carbon atoms, n is 1 or 2, and R* is optically active group containing an asymmetric carbon atom);

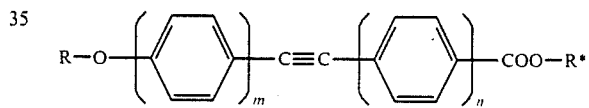

(wherein R is an alkyl group containing 6~18 carbon atoms, m and n are integers of 1 or 2, and R* is optically active group containing an asymmetric carbon atom); and

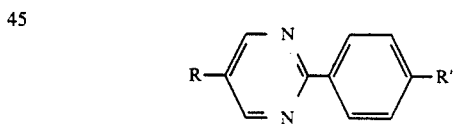

(wherein R and R' are alkyl or alkoxy groups containing 6~18 carbon atoms).

17. The composition of claim 14 which further contains one or more compounds selected from the group consisting of p'-(2-methyl-butoxycarbonyl)phenyl esters of 4-n-alkoxy-4'-biphenyl carboxylic acids, p'-(n-alkoxy-carbonyl)phenyl esters of 4-n-alkoxy-4'-biphenyl carbox-ylic acids, n-alkyl esters of 4-n-alkoxy-4'-biphenyl carboxylic acids, 2-methylbutyl esters of 4-n-alkoxy-4'-biphenyl carboxylic acids, p-alkoxybenzylidene-p'-amino-2-chloro-propyl cynnamates, p-alkoxybenzylidene-p'-amino-2-methyl-butylcynnamates, 4-(p-alkoxybiphenyl-p'-oxycarbon-yl)-4'-(2-methyl-butyloxy-carbonyl)-cyclohexanes, and p-n-alkyloxybenzylidene-p'-(2-methylbutoxycarbonyl)anilines.

18. The composition of claim 14, which contains at least 30% of the compound represented by the formula (1), based on the weight of the composition.

19. The composition of claim 15, which contains up to 70% of said other liquid crystal, based on the weight of the composition.
20. The composition of claim 14, which further contains up to 5% of at least one pleochroic dye, based on the weight of the composition.
21. The compound of claim 1, wherein X is —O—, A₁ is
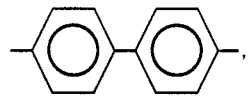
Y is —CO—O—, and A₂ is
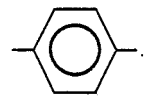
22. The compound of claim 1, wherein X is —C≡C—.
* * * * *